United States Patent [19]

Moen et al.

[11] 3,779,886

[45] Dec. 18, 1973

[54] CONTROL AND INDICATOR CIRCUITS FOR COULOMETRIC TITRATORS

[75] Inventors: Art Murphy Dean Moen, Covina; Jim Ray Robison, La Mirada, both of Calif.

[73] Assignee: International Telephone and Telegraph Corporation, New York, N.Y.

[22] Filed: May 17, 1972

[21] Appl. No.: 254,024

[52] U.S. Cl. .............................. 204/195 T, 204/1 T

[51] Int. Cl. .............................. G01n 27/44

[58] Field of Search.............. 204/1 T, 195 T, 195 R

[56] References Cited

UNITED STATES PATENTS 3,448,031 6/1969 Robinson .......................... 204/195 T

*Primary Examiner*—T. Jung

*Attorney*—C. Cornell Remsen, Jr. et al.

[57] ABSTRACT

A control circuit for a coulometric titrator having a recording voltmeter connected therein. The circuit utilizes two transistors of opposite conductivity types between which a low pass filter is connected. An emitter bias resistor is employed with one transistor. A zener diode and a resistor provides quiescent bias for the other transistor. The one transistor is provided with a base bias that is adjusted through the use of a potentiometer to cause both transistors to operate slightly above cut-off when the monitored fluid concentration is zero. The zener, the filter and the one transistor emitter resistor all improve the signal-to-noise ratio at the voltmeter without reducing the voltmeter dynamic response or accuracy of indication. The extraordinary range of the instrument is, for this reason, down to two parts per billion.

8 Claims, 3 Drawing Figures

CONTROL AND INDICATOR CIRCUITS FOR COULOMETRIC TITRATORS

BACKGROUND OF THE INVENTION

This invention relates to coulometric titration apparatus, and more particularly, to a circuit for indicating a titrator output and/or for controlling the operation of a titrator.

In the past, control and/or indication circuits have been provided for coulometric titrators. For example, see U. S. Pat. No. 3,448,031. The entire contents and disclosure of this patent is hereby incorporated herein hereat by this reference hereto.

The said patent discloses a coulometric titrator adapted to sense accurately changes in concentrations somewhat less than 100 ppb (parts per billion). However, to detect accurately changes in the $SO_2$ (sulfur dioxide) generated by automobile exhausts 50 yards or so from a freeway, changes in concentration down to 2 or 3 ppb is required. However, this sensitivity could not be achieved in the prior art.

SUMMARY OF THE INVENTION

In accordance with the titrator circuit of the present invention, a sensitivity to changes in concentration as small as 2 ppb has been achieved.

The extraordinarily high sensitivity of the present invention is partly achieved by the use of a low pass filter which reduces noise, but does not limit the dynamic response of the concentration indicator.

The high sensitivity is also made possible by means to keep two transistors above cut-off.

Still further, high sensitivity is achieved by increasing the bias on one of the transistors.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
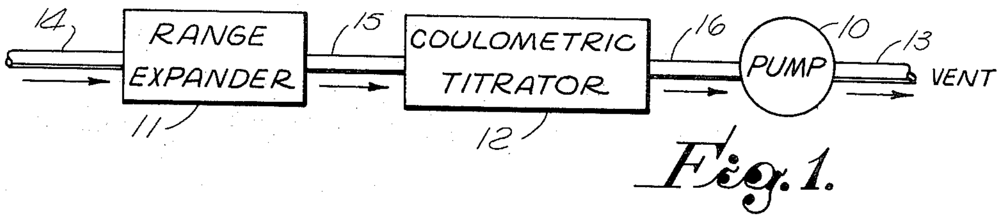
FIG. 1 is a block diagram of the system of the present invention.

In FIG. 1, a pump 10, which may be entirely conventional, is a vacuum pump or aspirator which draws ambient air through a range expander 11, and a coulometric titrator 12. The outlet of the titrator 12 is vented from a vent 13 connected from pump 10.

Range expander 11 has a hollow inlet tube 14. A hollow tube 15 connects the outlet of range expander 11 with the inlet of titrator 12. A hollow tube 16 connects the outlet of titrator 12 to the inlet of pump 10. Vent 13 is connected from the outlet of pump 10.

Figure 2:
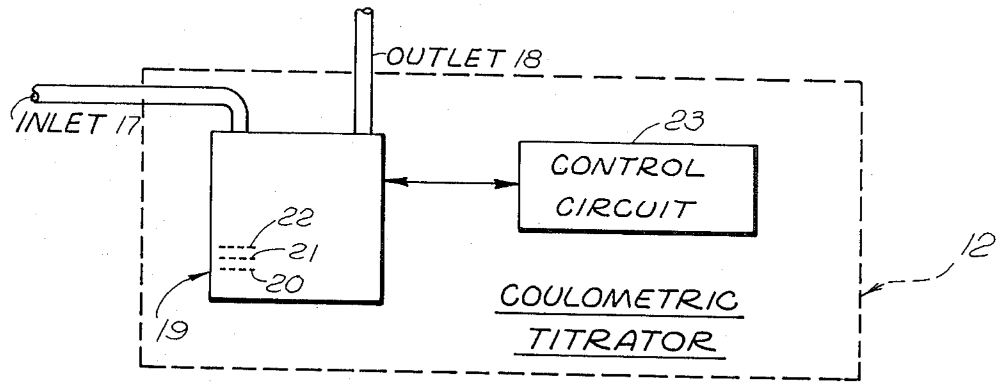
FIG. 2 is a block diagram of a coulometric titrator constructed in accordance with the present invention.

Titrator 12 is again shown in FIG. 2 having an inlet 17 connected from range expander 11 and an outlet 18 connected to pump 10. Inlet 17 extends into an electrolytic cell 19, outlet 18 being also connected from cell 19. Cell 19 has reference, generator and sensor electrodes 20, 21 and 22, respectively. Cell 19 including electrodes 20, 21 and 22 may be identical to the electrolytic cell disclosed in the said patent. A control circuit 23 is connected with electrodes 20, 21 and 22, as will be described.

Figure 3:
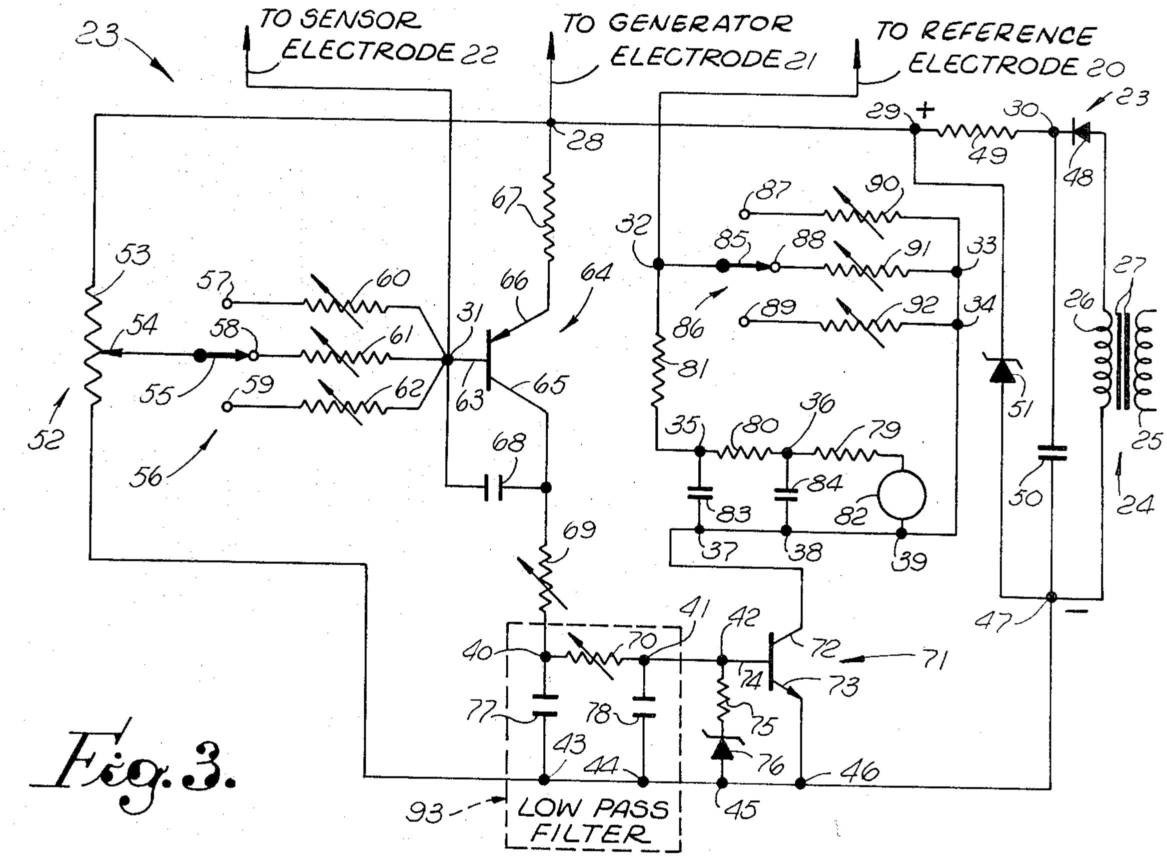
FIG. 3 is a schematic diagram of a control circuit shown in FIG. 2.

In FIG. 3, circuit 23 includes a transformer 24 having a primary winding 25, a secondary winding 26 and a ferromagnetic core 27. Junctions 28, 29, 30, 31, 32, 33, 34, 35, 36, 37, 38, 39, 40, 41, 42, 43, 44, 45, 46 and 47 are provided at various points around the circuit. A diode 48 is connected from the upper end of secondary winding 26 to junction 30, and is poled to be conductive toward junction 30. A resistor 49 is connected between junctions 29 and 30. A capacitor 50 is connected between junctions 30 and 47. A zener diode 51 is connected between junctions 29 and 47.

With the exception of the junctions, all of the structure disclosed hereinbefore in connection with FIG. 3 form a power supply and voltage regulator. This structure may be described as a "source of D.C. potential." The source may thus have output junctions 29 and 47.

Junctions 28 and 29 are connected together and to generator electrode 21. A potentiometer 52 has a winding 53 that is connected between junctions 28 and 43, junctions 43, 44, 45, 46 and 47 being connected together.

Potentiometer 52 has a wiper 54 which is connected to a pole 55 of a switch 56. Switch 56 has contacts 57, 58 and 59. Resistors 60, 61 and 62 are all connected from junction 31 to contacts 57, 58 and 59, respectively. Junction 31 is connected from sensor electrode 22 to the base 63 of a transistor 64. Transistor 64 has an emitter 66 and a collector 65. A resistor 67 is connected from emitter 66 to junction 28. A capacitor 68 is connected from junction 31 to collector 65. A resistor 69 is connected from collector 65 to junction 40. A resistor 70 is connected between junctions 40 and 41. A transistor is provided at 71 having a collector 72, an emitter 73 and a base 74. Junctions 41 and 42 are connected to transistor base 74. A resistor 75 and a zener diode 76 are connected in series between junctions 42 and 45. A capacitor 77 is connected between junctions 40 and 43. A capacitor 78 is connected between junctions 41 and 44.

Emitter 73 is connected to junction 46. Junctions 37, 38 and 39 are connected to collector 72. A recording voltmeter or other indicator 82 is connected from junction 39 via resistors 79, 80 and 81 to junction 32, resistors 79, 80 and 81 being connected in succession, in series, in that order, from indicator 82. A capacitor 83 is connected between junctions 35 and 37. A capacitor 84 is connected between junctions 36 and 38. The pole 85 of a switch 86 is connected from junction 32, junction 32 also being connected to generator electrode 20.

Switch 86 has contacts 87, 88 and 89. Resistor 90 is connected from contact 87 to junction 33. A resistor 91 is connected from contact 88 to junction 33. A resistor 92 is connected from contact 89 to junction 34. Junctions 34 and 39 are connected together.

The dotted box 93, shown in FIG. 3, is a low pass filter. Zener 51 may have a rating of 6.2 volts, if desired. Zener 76 may have a rating of about .5 volt, if desired.

Switches 56 and 86 may be ganged together, if desired. If so, they may be used as a range switch.

Although unexpected, the use of low pass filter 93 increases the signal-to-noise ratio of the signal at the base 74 of transistor 71 without decreasing the dynamic response of indicator 82.

In addition, signal-to-noise was increased by the use of resistor 67 providing negative bias for transistor 64.

In operation, the wiper 54 is adjusted in position on winding 53 of potentiometer 52 until both of the transistors 64 and 71 are operated slightly above cut-off. In this case, zener 76 has already fired. It is thus a feature of the invention that this operation, in combination with the operation of zener 76, further improves the signal-to-noise ratio.

OPERATION

In the operation of the circuit of FIG. 3, gas is bubbled through a liquid electrolyte past electrodes 20, 21 and 22 in that order. When sensor electrode 22 senses the gas being monitored as it flows past, transistor 64 is turned further on because the potential of the base 63 thereof is raised by the sensor electrode 22. The potential of base 63 may thus be raised periodically in pulses. Transistor 64 is returned to just over threshold when the reagent dispensed by generator electrode 21 is detected in the stream by the sensor electrode 22. Resistor 67 or the negative bias supplied thereby lowers the amplitudes of the pulses generated by transistor 64. Transistor 64, in addition, does not change radically in resistance because it has already been set above cut-off by adjustment of potentiometer 52, as aforesaid.

The pulse output of transistor 64 is then smoothed by low pass filter 93. Generator electrode 21 then generates reagent at a more constant rate with respect to time, and the high frequency components at the output of transistor 64 are not seen at the base 74 of transistor 71. The signal-to-noise ratio is thus improved but not at the expense of the dynamic response of indicator 82.

It is possible to use forward biased diodes of certain types that exhibit zener characteristics even in the forward biased condition. Such diodes may be employed in lieu of zener diode 76, if desired.

The word "indicator," as used herein in all of its forms, is hereby defined to include any means for producing an analog or other output signal directly proportional to the concentration of a constituent of a mixture regardless of how the signal is used. For example, the signal may not only be used to supply an input signal to a voltmeter calibrated in concentration, it may also be used to supply an input to a recording voltmeter or a process controller or otherwise.

The phrase "means connected" is hereby defined for use herein, in any of its forms, to mean either a conductive lead or one or more circuit components.

Range expander 11 is entirely conventional. It merely removes a known fixed percentage of the constituent in the atmosphere or sample mixture. Range expander 11 may be identical to that disclosed in copending application Ser. No. 40,671 filed May 26, 1970, filed by R. R. Austin and D. M. Creighton for CONCENTRATION REDUCTION METHOD AND APPARATUS. The entire contents and disclosure of the said co-pending application are hereby incorporated herein hereat by this reference hereto.

What is claimed is:

1. A coulometric titrator comprising: an electrolytic cell including generator, reference and sensor electrodes; a D.C. source of potential having plus and minus output junctions, said generator electrode being connected with said plus junction; first and second transistors each having a collector, an emitter and a base, said first transistor being of a PNP conductivity type, said second transistor being of an NPN conductivity type; first means connecting said plus junction to said first transistor emitter; a potentiometer having a winding and a wiper, said winding being connected between said plus and minus junctions; second means connecting said wiper to said first transistor base, said first transistor base also being connected with said sensor electrode; third and fourth means connected in parallel between said second transistor base and said minus junction; fifth means connecting said first transistor collector to said third means; and an indicator circuit connected between said second transistor collector and said reference electrode, said second transistor emitter being connected to said minus junction, said third means being a low pass filter.

2. The invention as defined in claim 1, wherein said first means includes a resistor.

3. The invention as defined in claim 2, wherein said fourth means includes a resistor and a zener diode connected in series, said potentiometer being set so that both of said transistors are above cut-off with a monitored fluid concentration of zero.

4. The invention as defined in claim 3, wherein a capacitor is connected from said first transistor base to said first transistor collector, said fifth means including a resistor, said filter including an auxiliary resistor, and a capacitor connected from said first and second ends thereof, respectively, to said minus junction, said first and second ends of said auxiliary resistor being connected to one end of said fifth means resistor and said second transistor base, respectively, said second means including a resistor, said indicator circuit including a recording voltmeter and first, second and third resistors connected in series in that order from said second transistor collector to said reference electrode, a capacitor connected between the junction of said second and third resistors to said second transistor collector, another capacitor connected from the junction of said first and second resistors to said second transistor collector, and a resistor connected from said second transistor collector to said reference electrode.

5. The invention as defined in claim 1, wherein said fourth means includes a resistor and a zener diode connected in series, said potentiometer being set so that both of said transistors are above cut-off with a monitored fluid concentration of zero.

6. A coulometric titrator comprising: an electrolytic cell including generator, reference and sensor electrodes; a D.C. source of potential having plus and minus output junctions, said generator electrode being connected with said plus junction; first and second transistors each having a collector, an emitter and a base, said first transistor being of a PNP conductivity type, said second transistor being of an NPN conductivity type; first means connecting said plus junction to said first transistor emitter; a potentiometer having a winding and a wiper, said winding being connected between said plus and minus junctions; second means connecting said wiper to said first transistor base, said first transistor base also being connected with said sensor electrode; third and fourth means connected in parallel between said second transistor base and said minus junction; fifth means connecting said first transistor collector to said third means; and an indicator circuit connected between said second transistor collector and said reference electrode, said second transistor emitter being connected to said minus junction, said fourth means including a resistor and a zener diode connected in series, said potentiometer being set so that both of said transistors are above cut-off with a monitored fluid concentration of zero.

7. The invention as defined in claim 6, wherein said first means includes a resistor.

8. A coulometric titrator comprising: an electrolytic cell including generator, reference and sensor electrodes; a D.C. source of potential having plus and minus output junctions, said generator electrode being connected with said plus junction; first and second transistors each having a collector, an emitter and a base, said first transistor being of a PNP conductivity type, said second transistor being of an NPN conductivity type; first means connecting said plus junction to said first transistor emitter; a potentiometer having a winding and a wiper, said winding being connected between said plus and minus junctions; second means connecting said wiper to said first transistor base, said first transistor base also being connected with said sensor electrode, third and fourth means connected in parallel between said second transistor base and said minus junction; fifth means connecting said first transistor collector to said third means; and an indicator circuit connected between said second transistor collector and said reference electrode, said second transistor emitter being connected to said minus junction, said first means including a resistor.

* * * * *